US006360648B1

(12) United States Patent
Lorenz et al.

(10) Patent No.: US 6,360,648 B1
(45) Date of Patent: Mar. 26, 2002

(54) FLUID OPERATED ROTARY DRIVE

(75) Inventors: Bernd Lorenz, Reichenbach/Fils; Ansgar Kriwet, Ostfildern; Dieter Bergemann, Filderstadt; Axel Thallemer, Esslingen, all of (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/565,317

(22) Filed: May 5, 2000

(30) Foreign Application Priority Data

Jun. 9, 1999 (EP) ........................................... 99111186

(51) Int. Cl.[7] ............................. F01B 19/00; F16J 3/00
(52) U.S. Cl. ........................................................... 92/92
(58) Field of Search ............................... 92/92, 91, 90, 92/89

(56) References Cited

U.S. PATENT DOCUMENTS 3,638,536 A 2/1972 Kleinwachter et al.
4,108,050 A 8/1978 Paynter
5,165,323 A 11/1992 Sato

FOREIGN PATENT DOCUMENTS

| | | |
|---|---|---|
| DE | 44 27 777 C2 | 2/1996 |
| EP | 0161750 B1 | 11/1985 |
| GB | 697707 | 9/1953 |

OTHER PUBLICATIONS

Patent Abstracts of Japan, vol. 010, No. 357, pub. No. 61153008, Jul. 11, 1986.
Patent Abstracts of Japan, vol. 007, No. 177, pub. No. 58081205, May 16, 1983.

*Primary Examiner*—Edward K. Look
*Assistant Examiner*—Michael Leslie
(74) *Attorney, Agent, or Firm*—Hoffmann & Baron, LLP

(57) ABSTRACT

A fluid power rotary drive having two head pieces, between which a hose body and a force transmitting structure extend. The head pieces bear against each other via supporting means permitting relative rotatability thereof in Abstract of the Disclosure such a manner that they are prevented from performing an axial relative movement involving mutual motion toward or away from the one another. When the interior space of the hose body is put under pressure a relative rotary movement between the two head pieces is caused.

23 Claims, 3 Drawing Sheets

FLUID OPERATED ROTARY DRIVE

BACKGROUND OF THE INVENTION

The invention relates to a fluid operated rotary drive comprising a hose body extending between two head pieces, and a power transmitting structure engaged with the two head pieces and adapted for cooperation with said hose body, said power transmitting structure being adapted to cause a relative rotary movement between the two head pieces when the interior space of the hose body is acted upon by fluid.

THE PRIOR ART

Known fluid operated rotary drives, as are more particularly employed in pneumatic systems, possess a rigid housing for example, in which a piston is arranged for axial motion, said piston so cooperating with the housing via further means that in the course of the axial motion it simultaneously performs a rotary movement. This rotary movement is transmitted with the aid of a rod, which is drivingly connected with the piston in such a manner as to prevent relative rotation so that the rod serves to make the rotary movement available, which for example can be utilized for the operation of a valve. A rotary drive of this type is disclosed in the German patent publication 4,427,779 C2.

A disadvantage in connection with such rotary drives is the high degree of mechanical complexity involved in their manufacture, be it in connection with the guidance of the piston or with the seal between it and the housing. These known rotary drives are consequently relatively expensive and liable to wear.

Therefore in the U.S. Pat. No. 3,638,536 a proposal has already been made for a fluid operated rotary drive of the type initially mentioned, in the case of which the rotary motion is produced by a hose body extending axially between two head pieces and provided with an integrated power transmitting structure. The hose body is here designed in the form of a contracting hose, which under the action of internal pressure expands radially and simultaneously via the power transmitting structure pulls the two head pieces toward each other. Owing to the design of the power transmitting structure as a strand structure with mutually parallel, helically extending ties, the axial contraction simultaneously results in a relative rotary movement between the two head pieces, and such rotary movement may be employed for the actuation of an object to be turned. However, the angular movement of the drive provided is relatively small so that the field of application of this known rotary drive has strict limitations and practical use is questionable.

SHORT SUMMARY OF THE INVENTION

Accordingly one object of the present invention is to provide a fluid operated rotary drive of the type initially mentioned ensuring larger angles of rotation while having compact dimensions.

In order to achieve these and/or other objects appearing from the present specification, claims and drawings, in the present invention the two head pieces bear against each other via support means while permitting their relative motion in such a manner that they are held against performing an axial relative motion toward and/or away from one another in order to maintain their relative axial position.

It has been found that if the relative ax al position of the two head pieces is set while simultaneously permitting a degree of freedom about the longitudinal axis, substantially larger angles of rotation are possible than is the case with a hose body designed in the form of a contraction element. Maintenance of the relative axial position is ensured by a supporting means effective between the two head pieces, whose axial direction of action may be selected in manner dependent on the design of the power transmission structure. It has been found that, dependent on the form of the power transmission structure and taking into account the axially acting working pressure areas of the head pieces, there is a certain tendency of the head pieces to move apart or to move together. This tendency to move out of position can be countered by suitable design of the support means. It is convenient then to select a form of the support means, which prevents axial relative movement between the two head pieces in both axial directions. The invention renders possible the production of rotary movements and torques with a predetermined coordination between working pressure, angular displacement and torque while avoiding axial movements as further dependent variables.

Further advantageous developments of the invention are defined in the claims.

In order to ensure reliable operation of the rotary drive even when it is not purely axial forces which are acting on the head pieces, it is an advantage to design the support means in such a manner that it is able to take up transverse forces and/or bending moments occurring between the two head pieces. Although for compensation of these loads it would also be possible to have resort to external means, as for example the objects themselves which are to be turned in relation to one another (if such objects are suitably mounted for rotation) to render possible universal application of the rotary drive, it is however best to integrate these support functions as well in the support means itself.

Moreover it is also to be noted that the support means does not necessarily have to be designed as a direct component of the rotary drive. Its function may, given a suitable design, be performed by the objects themselves to be turned in relation to one another or by other suitable external means.

The power or force transmission structure is preferably designed in the form of a strand structure, which possesses a plurality of flexibly bending ties extending between the head pieces and which more particularly extend with the form of a helical screw means between the two head pieces and which are responsible for the relative rotary movement when the hose body is acted upon internally. It would be feasible as well to set the relative position of the ties using warp-like transverse strands or with some other type of crosslinking means. However it has turned out to be particularly advantageous to design the strand structure exclusively in the form of ties running alongside each other and with the same longitudinal alignment. The position thereof is conveniently stabilized by having them at least partly embedded in the hose body, for example by vulcanization.

It has been found that by using a cylindrical strand- or thread-reinforced elastomeric hose only coiled in one direction, whose ends are locked on head pieces, said head pieces for their part being locked in the axial direction while being able to run freely in relation to the longitudinal axis of the hose, different degrees of rotation and levels of torque accurately correspond to different internal pressures and volumes of the hose.

It has been found that in the case of an initial oblique setting of the ties, that is to say in the pressureless state of the hose body, of more than 54.7° in relation to the longitudinal direction of the hose body when under pressure, there is at least initially a tendency of the head pieces to move apart axially. In this case a supporting means is employed, which at least prevents this relative axial movement. On the other hand in the case of an initial oblique setting of the ties of less than 54.7° and with the hose body under pressure there is an at least initial tendency to contract so that in such a case the supporting means should be so designed that the supporting means at least prevents a relative axial movement of the two head pieces in the form of their moving toward one another. Since during operation of the rotary drive the oblique angle will be reduced with an increase in twist it is to be recommended to have an axial support, effective between the two head pieces, when the initial oblique setting is equal to more than 54.4° and in the course of operation becomes less than this value.

It is has been found to be particularly advantageous to design the strand structure in such a manner that the initial oblique setting, measured in relation to the longitudinal direction of the hose body, of the ties is in a range between 55° and 65°.

In principle it would be feasible to install the supporting means at least partly outside hose body. However it is substantially more advantageous, owing to the saving in space, to accommodate the supporting means in the interior space of the hose body. This furthermore results in an effect reducing the amount of fluid, because the volume to be filled with fluid in the interior space of the hose body is reduced.

In order to provide particularly large angles of rotation between the two head pieces the hose body including contraction structure is designed with a correspondingly large overall length. However without additional measures this does lead to an excessively great radial extent of the hose body. For this reason in the case of rotary drives with relatively long hose bodies it is preferable to provide the respective hose body with means which locally influence the radial expansion of the hose body on the application of internal pressure and more particularly prevent same and here are referred to as constraining means. These constraining means can be distributed along the entire length of the hose body, it being for example a question of individual elements, which are more particularly designed in the form of rings or belts and are arranged coaxially in relation to the hose body with an axial spacing between them. In this respect it can be a question of rigid ring elements of plastic material or of metal. It would also be feasible to provide a fiber-like design of tough flexible material, as for example textile material.

In the case of a further convenient embodiment of the invention the constraining means are constituted by at least one helical body arranged coaxially in relation to the hose body, such helical body extending with the same or opposite hand as the strand structure along the periphery of the hose body, its configuration being selected to be similar to a helical spring for example.

The constraining means may be placed on the outer periphery of the hose body, although it is preferred for same to be at least partially and more especially completely integrated in the hose body.

In order to provide for a predetermined angle of turning it is furthermore convenient to have means which limit radial deformation of the hose body. They may be arranged in the interior space of the hose body or outside it and preferably will perform an abutment function.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES.

Figure 1:
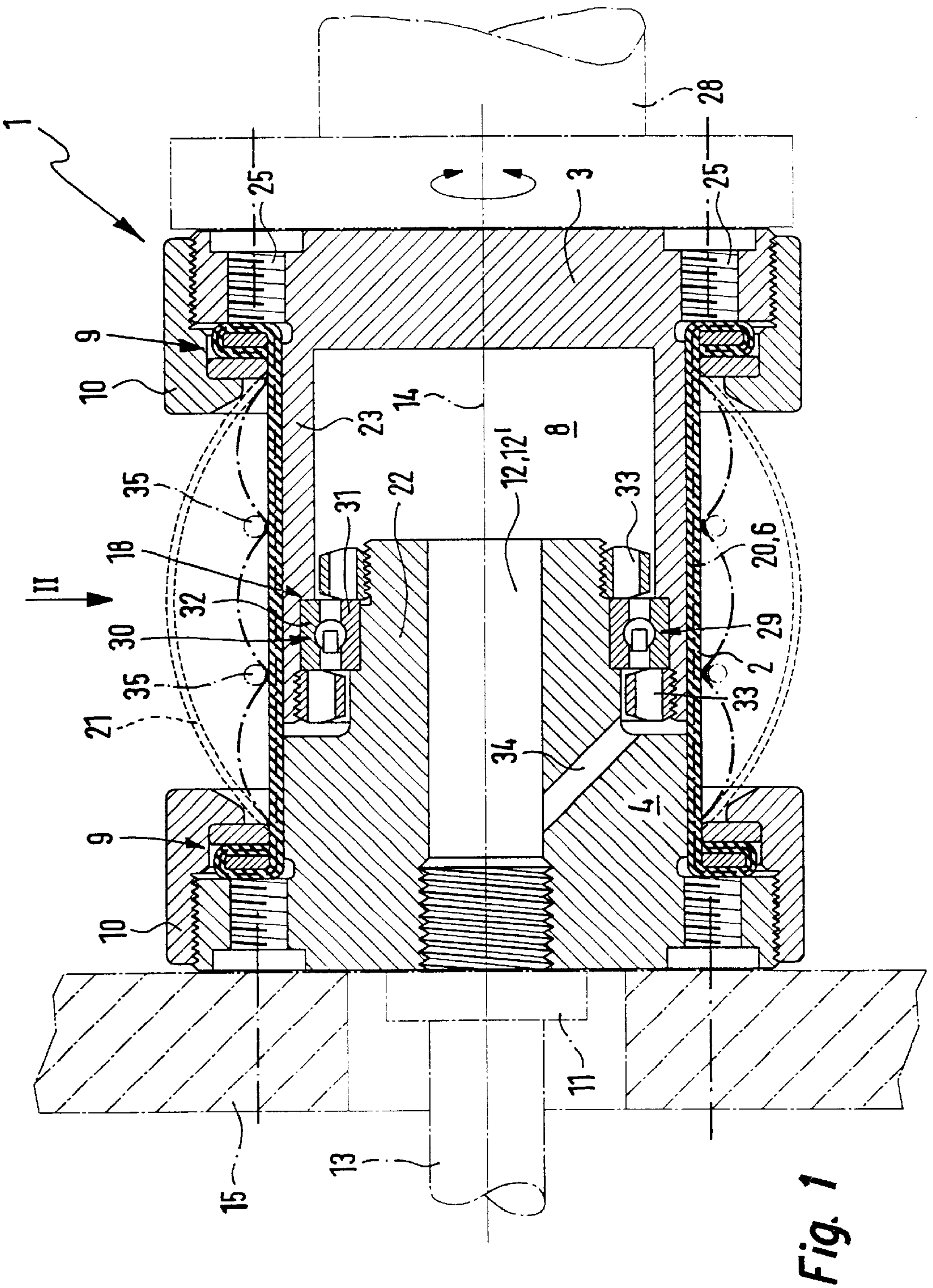
FIG. 1 is a longitudinal section of a first design of the rotary drive in accordance with the invention in the non-activated state thereof and with the hose body in the pressure-free state, a possible form of the hose body in the activated condition being indicated in chained lines.

DETAILED ACCOUNT OF WORKING EMBODIMENT OF THE INVENTION.

The rotary drive generally referenced 1 in the drawing is operated by fluid force, any gaseous or hydraulic fluid being suitable as a pressure medium. The working example is designed for operation with compressed air.

The rotary drive 1 is provided with two spaced head pieces 3 and 4, which in the following are referred to as the front and rear head piece 3 and 4, to aid comprehension and without any limiting intent. Between these head pieces 3 and 4 a flexible and preferably rubber-like hose body 2 extends axially, such body preferably consisting of rubber and being composed of one or more layers or plies of material.

At its two axial end sections the hose body 2 is secured to the respectively associated head pieces 3 and 4. This attachment may be produced in any suitable way, suitable clamping means 9 being provided in the working example. In this respect the axial end region of the hose body can be respectively fixed by means of a respective union nut 10 on its head piece.

The connection between the hose body 2 and each head piece 3 and 4 is produced in a sealing fashion. Therefore together with the two head pieces 3 and 4 the hose body 2 defines an interior space 8, which in case of need is able to be put under pressure with, for example, compressed air as the actuating fluid.

Actuation with fluid is ensured using fluid duct means 12 opening into the interior space 8. In the working example such means comprise a fluid duct 12" extending through one of the two head pieces 3 and 4, in the present case the rear head piece 4, the outer end of the duct 12" being connected via diagrammatically indicated connecting means 11 with a fluid duct 13 for connection with other means, via which duct 13 supply or removal of pressure medium to or from the interior space 8 may take place. It will be clear that separate fluid ducts may be provided for separate supply and removal of pressure medium.

The hose body 2 is provided with a force transmission structure 20, which is coaxially aligned with it and is diagrammatically indicated in chained lines. It extends axially between the two head faces 3 and 4, to which it is attached. Its design is such that on the one hand it has a high tensile strength and on the other hand is highly flexible. This objective may best be obtained if in accordance with the working example it is designed in the form of a strand structure 6 with a tubular configuration.

The strand structure 6 comprises a plurality of individual flexible ties 7 which are however at the same time suitable for the transmission of tensile forces between the two head pieces 3 and 4 and for instance comprise textile or metal fibers or also plastic material. Each tie 7 may consist a single fiber or filament although it is possible to employ a multi-fiber structure, more especially in the form of a plurality of individual fibers joined together as a strand.

The strand structure 6 could be separately designed as regards the hose body 2, it surrounding same completely around its periphery, for example in accordance with the suggestion of the European patent publication 0 161 750 B1. However it is to be preferred to have the design indicated in the working example, in the case of which the strand structure 6 is at least partially and preferably completely integrated in the hose body 2. The ties 7 are embedded in the material of the hose body 2 so that the hose body 2 and the force transmitting structure 20 constitute a unit of assembly, which is able to be jointly secured to the pieces 3 and 4. Owing to the attachment of the hose body 2 the force transmitting structure 20 is also fixed to the head pieces 3 and 4 so that it may exert tensile forces in relation to such pieces 3 and 4.

The power or force transmitting structure 20 is so designed that on putting the interior space 8 under pressure it causes a relative rotary movement between the two head pieces 3 and 4 about the longitudinal axis 14 of the hose body 2. Furthermore a support means 18 is present, via which the two head pieces 3 and 4 may bear against one another while maintaining their relative rotatability. The supporting function is so selected that the two head pieces 3 and 4 maintain their relative axial position irrespectively of the instantaneous operational state of the rotary drive 1, that is to say independently of the degree of pressurization of the interior space 8.

In the illustrated working embodiment the design of the supporting means 18 is so selected that it prevents any axially orientated relative movement of the two head pieces 3 and 4. The head pieces 3 and 4 may therefore neither move toward nor away from one another.

Figure 2:
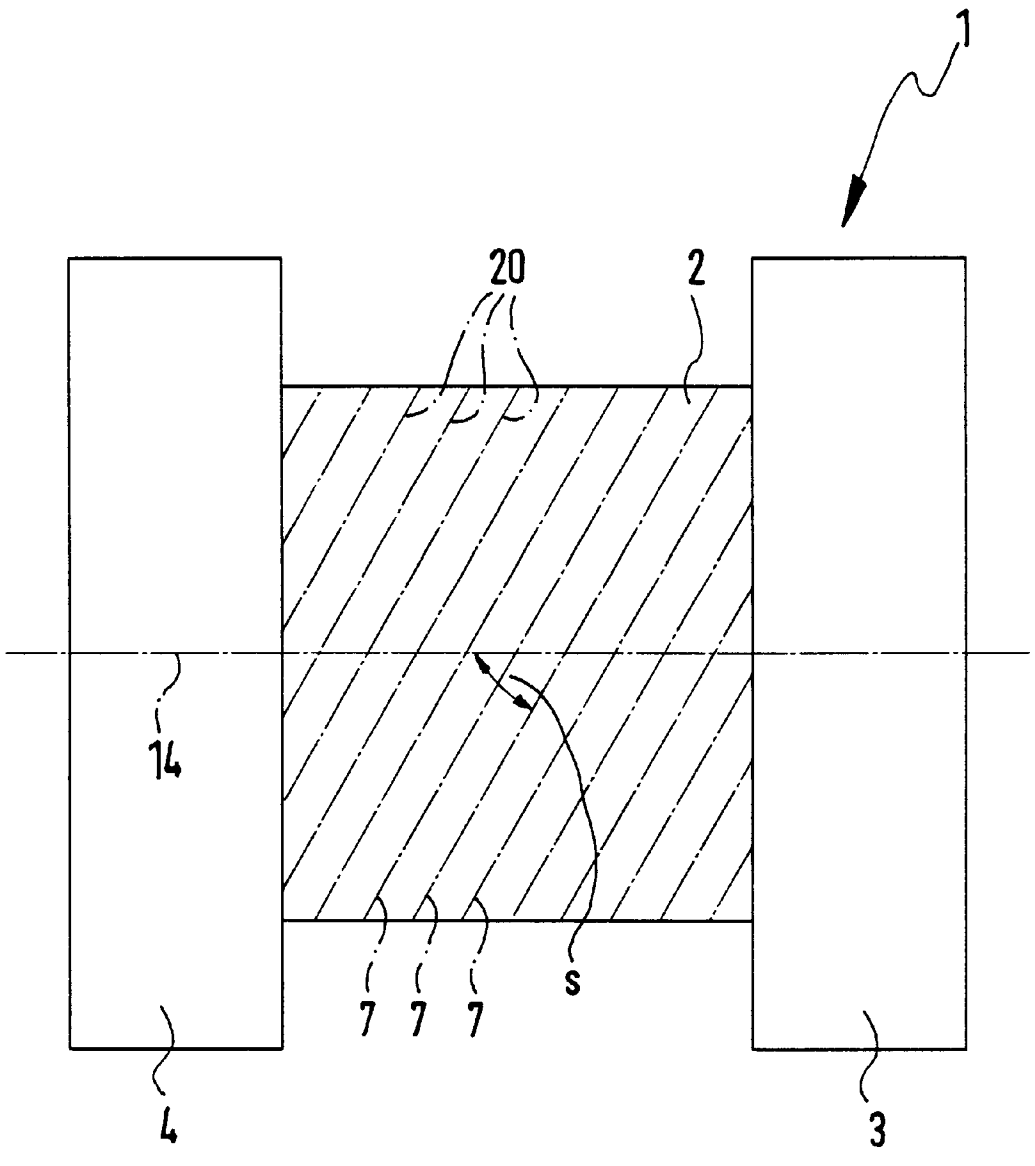
FIG. 2 is a diagrammatic lateral view of the rotary drive of FIG. 1 looking in the direction of the arrow II, the force or power transmitting structure being indicated in chained lines as in FIG. 1.

In the non-activated condition of the rotary drive 1, that is to say with the interior space 8 free of pressure, the hose body 2 and the force transmitting structure 20 assume the tubular form indicated in FIGS. 1 and 2. On supply of pressure medium under a gage pressure into the interior space 8 the rubber-like hose body 2 will expand radially as is indicated in chained lines in FIG. 1 at 21 by way of example. The consequence of this is a simultaneous radial thrust against the force transmitting structure 20, which owing to its particular structural design causes a relative rotary movement between the two head pieces 3 and 4 about the longitudinal axis 14. In the event of one of the head pieces, as in the present case the rear head piece 4, being fixed to a holder 15 in such a manner as to prevent relative rotation, it will be only the other head piece, that is to say in the present case the front head piece 3, which will perform the rotary movement. Power transmitting 25 means provided on this head piece 3 render possible the attachment of some suitable object 28, which is to be rotated. The object 28 may for example be a part of a machine or the actuating spindle of a rotary valve.

Owing to the axial support for the two head pieces 3 and 4 it is possible to ensure exactly the same, i. e. exactly reproducible, and relatively large angles of rotation.

If the rotary drive 1 is de-activated by depressurizing the interior space 8, the head pieces 3 and 4 will return to the initial relative angular position owing to the elastic return force of the hose body 2 in the absence of load or moment. It will be clear that it is also possible to provide additional, separate return means, although as a rule same will not be necessary.

The particularly advantageous strand structure 6 given by way of example is exclusively composed of ties 7, which extend in a helical array coaxial to the hose body 2 and with mutually the same longitudinal alignment between the two head pieces 3 and 4. In the side view as indicated by the arrow II or as seen in a developed view, there is consequently an oblique set between the longitudinal direction of the ties 7 and the longitudinal direction of the hose body 2, such set being marked as an oblique set angle in FIG. 2 at "s". In this respect it is convenient to provide such a design that the initial oblique set, that is to say the oblique angle "" in the pressure-free state of the interior space 8 and with a tubular state or alignment of the hose body 2 is in a range between 55° and 65°.

Starting with this initially oblique set the oblique angle "s" becomes less on the building up of pressure in the interior space 8 owing to the radial deformation of the ties 7. The result of this is an oblique action of the tension forces on the head pieces 3 and 4, which are accordingly twisted in relation to one another. The angle of rotation and the torque can be predetermined by the pressure set in the interior space or, respectively, the fluid volume introduced into the interior space 8.

It has been found that the resulting axial forces acting on the head pieces 3 and 4 at an instantaneous oblique setting of the ties 7 of 54.7° are subject to a reversal of direction. This means that the head pieces 3 and 4 in the working example are subject not only to the forces causing the relative rotary movement but also to axial forces, which initially act on them tending to move them apart. Such a movement is however prevented by the support means 18. If in the course of operation the oblique angle "s" becomes less than 54.7°, the head pieces 3 and 4 will be subject to an axial load tending to move them together. This as well will however be prevented by the support means 18.

Movement apart results from the internal fluid pressure and its constant working surface at the ends of the hose. Movement toward each other is the result of the axial component of all strand tension forces at the end pieces. These two effects cancel each other out, when the oblique angle at the thickest point of the hose body in the diameter has that value of 54.7°.

It will be clear that support means 18 can accordingly be designed taking into account the direction of action of the support function performed by it while also taking into account the working range of the strand structure 6. If during operation only oblique angle values "s" of over 54.7° occur, the support function may be limited to preventing mutual movement apart of the head pieces 3 and 4. If on the contrary the angle range is always below 54.7°, the design may be such that only support to prevent movement together in the axial direction is provided for. However even for reasons of strength of the rotary drive 1 as such it is good practice to provide a supporting action acting in either direction independently of the oblique angle occurring during operation, as is in fact the case with the working embodiment.

It is convenient to furthermore so design the support means 18 in such a manner that it can deal with transverse forces and/or flexure forces occurring between the two head pieces 3 and 4. The support means 18 then only permits a single degree of freedom, namely a relative rotary movement about the longitudinal axis. The rotary drive 1 is then able to be employed universally without any trouble under all different types of load occurring in practice.

In principle the support means 18, more particularly in the case of small diameters, could be installed outside the i hose body 2. However it is substantially more advantageous to adopt the design as in the working example wherein the support means 18 is arranged in the interior space 8 of the hose body 2. This renders possible compact dimensions and at the same time a fluid saving effect, since the volume to be filled for activating the rotary drive 1 is reduced.

In the illustrated working embodiment the support means 18 comprises two support elements 22 and 23 secured respectively to one of the head pieces 3 and 4 and preferably made integral with such head pieces 3 and 4, the support elements 22 and 23 being arranged coaxially in relation to one another and extending axially toward the other head piece 3 or 4. By means of an intermediately placed bearing means 29 the support elements 22 and 23 bear against one another, this ensuring a threefold degree of freedom. The bearing means 29 of the working embodiment comprises an anti-friction bearing means 30 with an inner ring 31 secured to a support element 22 and with an outer ring 32 secured to the other support element 23, anti-friction elements, more particularly ball-like elements, being placed between these two rings. The attachment of the rings 31 and 32 by the use of suitable attachment means 33, in the present case in the form of screw elements. The anti-friction bearing means 30 performs the function of a thrust bearing resisting pulling and pushing forces and it can furthermore resist transverse forces and bending moments. Only a rotary movement between the two support element 22 and 23 and, respectively, the pieces 3 and 4 connected with them is possible.

The support elements 22 and 23 may also contribute to stabilizing the hose body 2 when the rotary drive 1 is not active. In the illustrated working embodiment there is a provision such that the hose body 2 coaxially abuts on the outer faces of the support elements 22 and 23 in the pressure-free state of the interior space 8. Suitable duct connections 34 in the head pieces 3 and 4 nevertheless serve to permit the desired access of fluid to the inner wall face of the hose body 2.

The rotary drive 1 should as far as possible be so designed that the change in the diameter of the hose body 2 does not amount to more than 100% in operation. On the other hand an increase of the angle of rotation able to be produced in excess of the size of the angle already achieved may only be produced by axially increasing the longitudinal of the hose body 2 and of the force transmitting means 25. In order to comply with both of these conditions the hose body 2 could be provided with means which locally affect and more especially prevent its radial increase in size when it is put under pressure. Such means will in the following be referred as constraining means and are indicated in FIG. 1 in chained lines at 35 in a possible form of embodiment.

In accordance with this form of embodiment the constraining means 35 include one or more ring-or belt-like elements, which are arranged coaxially in relation to the hose body 2. If several elements are present they are axially distributed along the length of the hose body 2. When the hose body 3 is put under pressure it is accordingly only the wall sections between mutually adjacent constraining means 35 of the hose body 2 which are able to expand radially. This means that when the hose body 2 is under pressure it will be expanded or caused to bulge out at several areas, the increase in diameter being however several times less, in comparison with the inactive condition, than in the case of a design without means for limiting expansion.

Figure 1A:
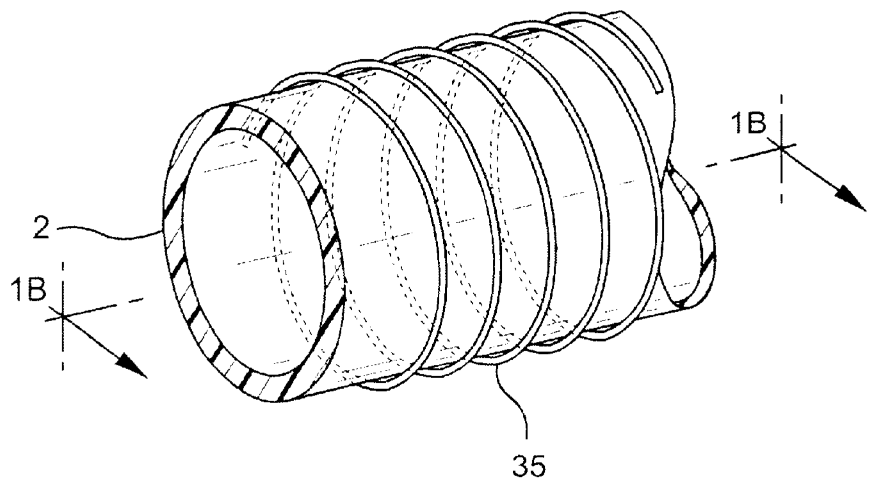
FIG. 1A is a diagrammatic perspective view showing a helical constraining means extending about the hose body.

In the case of an alternative design, as shown in FIG. 1A, it is possible for the constraining or limiting means to include at least one coiled helix extending coaxially in relation to the hose body 2. This screw body could then have the configuration of a helical spring arranged coaxially to the ho s e body 2.

Constraining means 35 coiled with the same hand as the strand structure (but with a substantially larger pitch or respectively a substantially smaller inclined set), result in a locally reduced expansion of the interior space, whereas constraining means 35 of the opposite hand to the strand structure (but also with a substantially larger pitch or substantially smaller oblique set) cause a local constriction of the interior space.

Figure 1B:
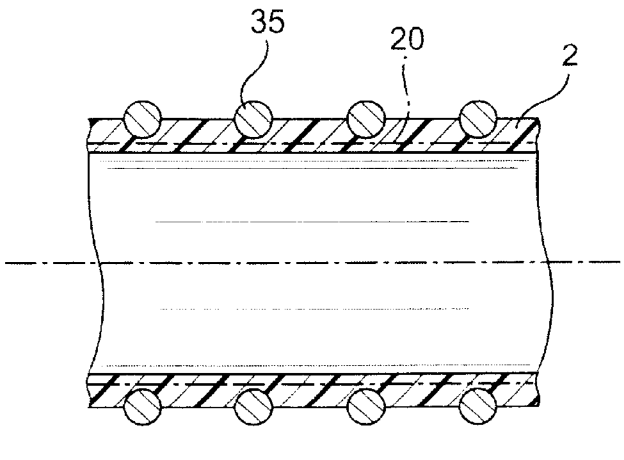
FIG. 1B is a partial longitudinal section of the hose body having the constraining means integrally formed therewith.

In all embodiments it is possible for the constrainig means, as in the embodiment, to be placed on the radially outer face of the hose body 2. A more advantageous design, as shown in FIG. 1B, however involves at least partly and preferably complete integration of the constraining means 35 in the wall of the hose body 2. It would be feasible as well for the constraining means 35 to be integrated in the force transmitting means 25 and, in the case of design in the form of a strand structure 6, to provide a suitable linking of the individual ties 7 with the constraining means 35. It would also be possible to integrate the constraining means 35 in the force transmitting means 25 and in one design as a strand structure 6, to provide a suitable linkage of the constraining means 35 with the individual ties 7. It is in this particular case that it is expedient to design the constraining means 35 also in the form of flexible and for example fiber-like strand elements, a textile structure being conceivable as in the case of the strand structure 6. However, the constraining means 35 could also consist of a generally rigid material, as for example a suitably hard plastic or a metal. of a strand structure 6, to provide a suitable linking of the individual ties 7 with the constraining means 35. It would also be possible to integrate the constraining means 35 in the force transmitting means 25 and in one design as a strand structure 6, to provide a suitable linkage of the constraining means 35 with the individual ties 7. It is in this particular case that it is expedient to design the constraining means 35 also in the form of flexible and for example fiber-like strand elements, a textile structure being conceivable as in the case of the strand structure 6. However the constraining means 35 could also consist of a generally rigid material, as for example a suitably hard plastic or a metal.

In order to preset a predetermined maximum angle of rotation it is possible to provide means (not illustrated) in the interior space 8 of the hose body 2 or radially outside the hose body 2, which limit radial deformation of the hose body 2. The means preferably perform an abutment function and may consequently be termed abutment means.

It would also be possible to provide abutment means for limiting the angle of rotation by limiting the increase in diameter of the hose body 6. If constraining means 35 coiled opposite in hand to the strand structure 6 are provide, it is possible for the abutment function to be performed by having an external diameter of the support elements 22 and 23 which is made less than the internal diameter of the hose body 2. It would also be possible, more especially in the case of small hose body diameters, to employ abutment means placed outside the hose body 2 for directly limiting the expansion of diameter. In all cases the abutment means may be constituted by a suitably designed support means 18.

What is claimed is:

1. A fluid operated rotary drive comprising.

a hose body extending between two head pieces, a force transmitting structure engaged with the two head pieces and adapted for cooperation with said hose body, said force transmitting structure being adapted to cause a relative rotary movement between the two head pieces when the interior space of the hose body is acted upon by fluid, and support means being located in an interior of the hose body, wherein the two head pieces bear against each other via the support means while permitting their relative motion in such a manner that they are held against performing an axial relative motion toward and/or away from one another in order to maintain their relative axial position.

2. The rotary drive as set forth in claim 1, wherein the support means is so designed that it may resist transverse forces and/or flexure moments occurring between the two head pieces.

3. The rotary drive as set forth in claim 1, wherein the force transmitting structure is in the form of a strand structure, which possesses a plurality of flexible ties extending between the head pieces.

4. The rotary drive as set forth in claim 3, wherein the ties extend in coaxial relationship to the hose body in a helical manner with a mutually equal longitudinal alignment between the two head pieces.

5. The rotary drive as set forth in claim 4, wherein in the case of an initial oblique setting of the ties of more than 54.7° related to the longitudinal direction of the hose body the supporting means is so designed to prevent axial relative movement of the two head pieces involving a movement apart.

6. The rotary drive as set forth in claim 4, wherein in the case of an initial oblique setting of the ties of less than 54.7° related to the longitudinal direction of the hose body the supporting means is so designed that it at least prevents a relative axial movement of the two head pieces in the form of a movement thereof toward one another.

7. The rotary drive as set forth in claim 3, wherein the initial oblique set of the ties as related to the longitudinal direction of the hose body is in a range of 55° to 65°.

8. The rotary drive as set forth in claim 1, the supporting means possesses at least two supporting elements which are respectively provided on one of the two head pieces, extend toward the respectively other head piece and bear against one another in a manner permitting relative rotation.

9. The rotary drive as set forth in claim 1, comprising force transmitting means provided on at least one of the head pieces, said force transmitting means being coupled, or able to be coupled, in such a manner as to prevent relative rotation with a means adapted to perform a rotary movement.

10. The rotary drive as set forth in claim 1, wherein the force transmitting structure is at least partly integrated in the wall of the hose body.

11. The rotary drive as set forth in claim 1, comprising constraining means associated with the hose body, said constraining means being adapted to Locally influence and more especially locally prevent radial expansion of the hose body when its interior space is put under pressure.

12. The rotary drive as set forth in claim 11, wherein the constraining means are distributed along the length of the hose body.

13. The rotary drive as set forth in claim 11, wherein the constraining means possess ring-or belt-like elements arranged coaxially in relation to the hose body.

14. The rotary drive as set forth in claim 11, wherein the constraining means comprise at least one helical body extending coaxially to the hose body.

15. The rotary drive as set forth in claim 14, wherein in the case of a force transmitting structure in the form of a helical screw structure the hand of the helical body is the same or opposite to the hand of the strand structure.

16. The rotary drive as set forth in claim 11, wherein the constraining means are at least partly integrated in the wall of the hose body.

17. The rotary drive as set forth in claim 1, comprising means arranged inside and/or outside the hose body, such means being adapted to limit the radial deformation of the hose body for presetting a predetermined degree of rotation.

18. A fluid operated rotary drive comprising:

a hose body extending between two head pieces, a support having at least two supporting elements which are respectively provided on one of the two head pieces, extend toward the respectively other head piece and bear against one another in a manner permitting relative rotation, and a force transmitting structure engaged with the two head pieces and adapted for cooperation with said hose body, the force transmitting structure being adapted to cause a relative rotary movement between the two head pieces when the interior space of the hose body is acted upon by fluid, wherein the two head pieces bear against each other via the support while permitting their relative motion in such a manner that they are held against axial relative motion toward and/or away from one another in order to maintain their relative axial position.

19. A fluid operated rotary drive comprising:

a hose body extending between two head pieces and having an interior space, constraining means associated with the hose body, said constraining means being adapted to locally influence radial expansion of the hose body when its interior space is put under pressure, the constraining means including at least one helical body extending coaxially to the hose body, a force transmitting structure engaged with the two head pieces and adapted for cooperation with said hose body, said force transmitting structure being adapted to cause a relative rotary movement between the two head pieces when the interior space of the hose body is acted upon by fluid, and wherein the two head pieces bear against each other via support means while permitting their relative motion in such a maimer that they are held against performing an axial relative motion toward and/or away from one another in order to maintain their relative axial position.

20. The rotary drive as set forth in claim 19, wherein in the case of a force transmitting structure in the form of a helical screw structure the hand of the helical body is the same or opposite to the hand of the strand structure.

21. A fluid operated rotary drive comprising:

a hose body extending between two head pieces and having an interior space, constraining means associated with the hose body, said constraining means being adapted to locally influence radial expansion of the hose body when its interior space is put under pressure, the constraining means being at least partly integrated in a wall of the hose body, a force transmitting structure engaged with the two head pieces and adapted for cooperation with said hose body, said force transmitting structure being adapted to cause a relative rotary movement between the two head pieces when the interior space of the hose body is acted upon by fluid, and wherein the two head pieces bear against each other via support means while permitting their relative motion in such a manner that they are held against performing an axial relative motion toward and/or away from one another in order to maintain their relative axial position.

22. A fluid operated rotary drive comprising:

a hose body extending between two head pieces, means arranged inside and/or outside the hose body, such means being adapted to limit radial deformation of the hose body for presetting a predetermined degree of rotation, a force transmitting structure engaged with the two head pieces and adapted for cooperation with said hose body, said force transmitting structure being adapted to cause a relative rotary movement between the two head pieces when the interior space of the hose body is acted upon by fluid, and wherein the two head pieces bear against each other via support means while permitting their relative motion in such a manner that they are held against performing an axial relative motion toward and/or away from one another in order to maintain their relative axial position.

23. A fluid operated rotary drive comprising:

a hose body extending between two head pieces, a force transmitting structure including a plurality of flexible ties extending between and engaged with the two head pieces and adapted for cooperation with said hose body, said ties having an initial position in the range of 55 to 65 degrees relative to a longitudinal direction of the hose body, said force transmitting structure being adapted to cause a relative rotary movement between the two head pieces when the interior space of the hose body is acted upon by fluid, and wherein the two head pieces bear against each other via a support means while permitting their relative motion in such a manner that they are held against performing an axial relative motion toward and/or away from one another in order to maintain their relative axial position.

* * * * *

UNITED STATES PATENT AND TRADEMARK OFFICE

CERTIFICATE OF CORRECTION

PATENT NO. : 6,360,648 B1 
DATED : June 5, 2002
INVENTOR(S) : Lorenz et al.

It is certified that error appears in the above-identified patent and that said Letters Patent is hereby corrected as shown below:

Title page,
ABSTRACT,
Line 4, now reads "rotatability thereof in Abstract of the Disclosure such a manner" should read -- rotability thereof in such a manner --;

Column 1,
Line 66, now reads "relative ax_al" should read -- relative axial --;

Column 6,
Line 16, now reads "oblique angle " " should read -- oblique angle "s" -- ;

Column 7,
Line 5, now reads "outside the i hose body" should read -- outside the hose body --;

Column 8,
Lines 37-49, delete "of a strand structure … ...plastic or a metal"

Column 10,
Line 51, now reads "in such a maimer" should read -- in such a manner --.

Signed and Sealed this

Twenty-third Day of July, 2002

*Attest:*

JAMES E. ROGAN

*Attesting Officer* *Director of the United States Patent and Trademark Office*